United States Patent
Ramaswamy

(10) Patent No.: US 9,143,478 B2
(45) Date of Patent: Sep. 22, 2015

(54) EMAIL WITH SOCIAL ATTRIBUTES

(75) Inventor: Venkat Ramaswamy, Falls Church, VA (US)

(73) Assignee: Venkat Ramaswamy, Falls Church, VA (US)

(*) Notice: Subject to any disclaimer, the term of this patent is extended or adjusted under 35 U.S.C. 154(b) by 840 days.

(21) Appl. No.: 12/614,418

(22) Filed: Nov. 8, 2009

(65) Prior Publication Data

US 2011/0113317 A1   May 12, 2011

(51) Int. Cl.
   *G06F 17/00* (2006.01)
   *H04L 29/12* (2006.01)
   *G06F 17/30* (2006.01)
   *G06Q 10/10* (2012.01)
   *H04L 29/08* (2006.01)
   *H04L 12/58* (2006.01)

(52) U.S. Cl.
   CPC ...... *H04L 61/1564* (2013.01); *G06F 17/30876* (2013.01); *G06Q 10/107* (2013.01); *H04L 29/1215* (2013.01); *H04L 51/14* (2013.01); *H04L 51/18* (2013.01); *H04L 67/02* (2013.01); *H04L 67/22* (2013.01); *H04L 51/08* (2013.01); *H04L 51/16* (2013.01)

(58) Field of Classification Search
   CPC . G06F 17/3089; G06F 17/24; H04L 29/1215; H04L 51/18
   USPC .......... 715/206, 208, 752; 709/206, 217, 219, 709/245
   See application file for complete search history.

(56) References Cited

U.S. PATENT DOCUMENTS

| | | | | |
|---|---|---|---|---|
| 6,192,407 B1 * | 2/2001 | Smith et al. | ........... | 709/229 |
| 6,360,254 B1 * | 3/2002 | Linden et al. | ........... | 709/219 |
| 6,957,224 B1 * | 10/2005 | Megiddo et al. | ........... | 1/1 |
| 6,993,559 B2 * | 1/2006 | Jilk et al. | ........... | 709/206 |
| 7,167,898 B2 * | 1/2007 | Sato et al. | ........... | 709/204 |
| 7,606,865 B2 * | 10/2009 | Kumar et al. | ........... | 709/206 |
| 7,634,543 B1 * | 12/2009 | Van Zant et al. | ........... | 709/206 |
| 7,809,796 B1 * | 10/2010 | Bloch et al. | ........... | 709/206 |
| 8,069,213 B2 * | 11/2011 | Bloch et al. | ........... | 709/206 |
| 8,145,710 B2 * | 3/2012 | Cowings et al. | ........... | 709/205 |
| 8,225,480 B2 * | 7/2012 | Schonecker et al. | | |
| 8,255,480 B2 * | 8/2012 | Bedingfield et al. | ........... | 709/217 |
| 8,474,048 B2 * | 6/2013 | Masood | ........... | 726/24 |
| 8,494,968 B2 * | 7/2013 | Hammad et al. | ........... | 705/71 |
| 8,595,325 B2 * | 11/2013 | Bedingfield et al. | ........... | 709/219 |
| 2002/0107986 A1 * | 8/2002 | Pfohe et al. | ........... | 709/246 |
| 2003/0055893 A1 * | 3/2003 | Sato et al. | ........... | 709/204 |
| 2003/0101271 A1 * | 5/2003 | Smith et al. | ........... | 709/229 |
| 2003/0237005 A1 * | 12/2003 | Bar-Or et al. | ........... | 713/201 |
| 2004/0199762 A1 * | 10/2004 | Carlson et al. | ........... | 713/153 |
| 2005/0015626 A1 * | 1/2005 | Chasin | ........... | 713/201 |
| 2007/0124414 A1 * | 5/2007 | Bedingfield et al. | ........... | 709/217 |
| 2007/0124499 A1 * | 5/2007 | Bedingfield et al. | ........... | 709/245 |
| 2007/0124500 A1 * | 5/2007 | Bedingfield et al. | ........... | 709/245 |
| 2007/0168560 A1 * | 7/2007 | Alkire | ........... | 709/247 |
| 2008/0195665 A1 * | 8/2008 | Mason et al. | ........... | 707/104.1 |
| 2009/0100169 A1 * | 4/2009 | Allen et al. | ........... | 709/224 |
| 2009/0248656 A1 * | 10/2009 | Blinnikka | ........... | 707/5 |
| 2010/0058160 A1 * | 3/2010 | Navarro et al. | ........... | 715/208 |
| 2010/0192210 A1 * | 7/2010 | Purdy et al. | ........... | 726/7 |
| 2010/0318611 A1 * | 12/2010 | Curtin et al. | ........... | 709/206 |
| 2011/0035284 A1 * | 2/2011 | Moshfeghi | ........... | 705/14.58 |
| 2011/0113317 A1 * | 5/2011 | Ramaswamy | ........... | 715/205 |
| 2011/0191849 A1 * | 8/2011 | Jayaraman et al. | ........... | 726/23 |
| 2012/0290923 A1 * | 11/2012 | Bedingfield et al. | ........... | 715/234 |

* cited by examiner

*Primary Examiner* — Stephen Hong
*Assistant Examiner* — Matthew Ludwig

(57) ABSTRACT

This invention is an email system that replaces every URL, attachment and image in the email message with a short URL, where the original URL, attachment or image is publicly accessible through the short URL. The system further includes the short URL in the public profile associated with the email address of the sender and also publishes the most popular short URLs in the system.

40 Claims, No Drawings

EMAIL WITH SOCIAL ATTRIBUTES

FIELD OF INVENTION

This invention pertains to an email system and public profiles.

BACKGROUND OF THE INVENTION

URL Redirection:

URL redirection, also called URL forwarding is a technique on the World Wide Web for making a web page available under many URLs. There are several ways to redirect a URL including (a) Showing a page with a link and asking the user to manually click on it (b) HTTP redirect (c) javascript redirect (d) using .htaccess files (e) using HTTP Meta and Refresh tags and (e) Frame redirect where one frame shows the redirected page URL Shortening:

URL shortening is a technique on the World Wide Web where a provider makes a web page, typically owned by another entity, available under a short URL in the provider's domain, in addition to the original address. tinyurl.com is one of the companies that offers this service. For example, the page http://en.wikipedia.org/w/index.php?title=TinyURL&diff=2836210 22&oldid=283308287 points to http://tinyurl.com/mmw6lb.

The provider controls the domain of the rewritten URL and hence has the ability to track and maintain access to the original web page through the rewritten URL.

SMTP Proxy:

An SMTP proxy is an email system that receives emails from the user and sends it to another email system. When SMTP proxies are placed on the outgoing network, they typically are used to intercept all SMTP connections to make sure that unauthorized e-mail, spam, e-mail worms, etc. are not sent from the network.

Web Email:

Web email systems such as Google or Yahoo are used by millions of people worldwide. These systems create private URLs for attachments and images in the emails. They make sure that these private URLs are accessible only to the people who sent and received the message, and not accessible to others. These systems show those private links outside the email message body when the message is displayed on the browser. When an email is sent to another system, they embed the attachment in the message in an encoded form as specified in the MIME specifications RFC 2045 and RFC 2822.

Social Bookmarking:

A social bookmarking system allows users to save links to web pages that they want to remember and/or share. These bookmarks are usually public, and can be saved privately, shared only with specified people or groups, shared only inside certain networks, or another combination of public and private domains. These bookmarks can also be emailed to others. Digg, Delicious, Reddit, Google Bookmarks and Yahoo Bookmarks are some of the popular social bookmarking sites.

SUMMARY OF INVENTION

Email is used widely to share a link to an interesting article on the web, a public document or a picture with friends and family. But current email systems neither track these elements nor make them available to people other than those to whom they were sent. This invention is an email system that rewrites every link, attachment and image in each email sent or received by the system to a public, short URL and tracks access to those short URLs. It further places the short URLs in a public profile associated with that email address in the system.

DETAILED DESCRIPTION OF THE INVENTION

People use Facebook, MySpace, Digg, Reddit, Google bookmarks and other services to share a link to an online article. But email is still a very popular way to share a link as almost everyone has email and use email frequently.

Email systems such as Google and Yahoo process the message body to extract information related to search and advertising. They also create private links for attachments and images in the email and only people who sent or received that email message can access the attachments and images through those links. When a Google or Yahoo user sees the email online, the links to the attachments are shown outside of the message body. If that user forwards the message to an email in another system, say Hotmail, the attachment is embedded in the message in an encoded format as specified in email RFC 2045. These systems do not change the links in the body of the message.

This invention is an email system ("system") that performs the usual email operations of sending and receiving emails. It further processes each email message that it sends and receives and performs the following actions:

(a) The system replaces each HTML link ("original link") in the message with a short URL in the system's domain. Any incoming request to the short URL will be redirected by the system to the HTML link that the short URL replaced.

(b) The system processes each attachment, saves it in the system, creates a short URL for that attachment and places the short URL in the body of the message. The attachment becomes publicly accessible through the short URL by anyone on the internet.

(c) The system processes each embedded image in the message, saves it in the system, creates a short URL for that image and replaces all references to that image in the HTML message body with the corresponding short URL. The embedded image then becomes publicly accessible through the short URL by anyone on the internet.

(d) The system processes each HTML image tag in the message and if the image tag points to an external URL in its src attribute, the system replaces that URL with a short URL just like an original link.

(e) If the email is sent by an account in the system, the system adds all such short URLs from original links, attachments and images in the email message to the public profile associated with that email account.

(f) The system indexes the message content and the content of the web pages of all the original links included in the message and any textual content in the attachments using a text search engine like Apache Lucene.

The system redirects any incoming request to the short URL to the original link, attachment or image. The system might show an interstitial advertisement before redirecting to an original link or attachment.

Deduping

Deduping is the process of not duplicating the same data. This system applies deduping to links, attachments and images. When the system processes the same link, attachment or image multiple times in the same message or different messages, the system generates the same short URL.

The system dedupes a link at three levels:

(a) When an original link in the message exactly matches another original link that was previously seen, the system uses the same short URL that was used for the previous original link. The system compares original links using their normalized forms.

(b) Sometimes HTTP links when accessed redirect to another link using HTTP redirect. When an original link in an email message redirects, the system remembers both the original link and the link to which the control was redirected to. When it subsequently sees either the original link or the redirected link, it uses the same short URL.

(c) For each original link, the system fetches the content of the web page and creates a hash value on the content using a hashing algorithm like SHA. For HTML pages, this match can be performed on just the text content, ignoring markups in HTML tags. The match can also ignore white spaces and dates in the text. When the system sees a new original link with the same hash value on the link's content as a previously seen original link, it replaces the new link with the same short URL as the previously seen link.

The system dedupes attachments and images based on the hash value of its content using standard hashing algorithms like SHA.

Link Title

HTML Web pages usually specify a meaningful title inside the <title> tag. The system extracts this information for each original link and associates it with the short URL. The system uses this title text to display the short URL in profiles and popular lists.

If an email has an empty subject line, the system fills the subject line with the title of the first short URL in the message.

Public Profile

The system maintains a public profile for every email account in the system. When an email is sent from that account, every short URL in that message corresponding to an original link, attachment or image is placed in the profile. The system also includes the date and time at which the URL was sent and arranges them in reverse chronological order. The system makes this profile publicly accessible to anyone over the internet.

The system also includes the list of friends of this email account in the profile. A friend of this email account is defined as another email account in the system with which this account has sent and received at least one email.

The system provides user specific settings to suppress various parts of the profile including links, attachments, images, friends and timestamp on the profile entries. The system also allows each user to make the entire profile associated with his email account to be private.

The system allows the user to include a special address in the recipient list of the form private@<domain>.com, where <domain> is the name of the internet domain under which this email system is hosted. When the user includes this address in the recipient list, the system does not include the short URLs in that message in his public profile.

The system provides a special address of the form public@<domain>.com, where <domain> is the name of the web domain under which this system is hosted. When the user includes this address in the recipient list, the system includes all the short URLs in that message to the user's public profile. The user can choose to not include short URLs in regular emails to his profile with a user specific setting and include them only if he specifies this special address as one of the recipients.

Recent Activity

The system shows all the latest short URLs posted by all of the user's friends. The system also sends this list in an email message periodically to an alternate email address that the user has specified. This allows the user to get periodic notification of links posted by his friends even if he does not login to this email account. The system also makes these links available as a RSS feed specific to that user.

Tracking

All short URLs created by this system serve as a gateway for any user who receives emails from this system whether those email accounts are within the system or outside. Since this system replaces attachments as short URLs inside the email message, attachments behave just like short URLs. Similarly, all images in email messages are accessed only through the short URLs that the system placed in the message.

As a message spreads by forwarding among friends, users accessing the short URLs in the message have to go through this system before they get redirected to the target web page. As users get redirected, this system tracks the number of people that read a link, attachment or accessed the image, whether they are within or outside the system. The system can also use tracking cookies similar to third party advertisers like doubleclick.com to track users outside the system.

On the contrary, when a traditional email system like Google sends an email to a Yahoo account, it includes the entire attachment body within the message in an encoded form, as per RFC 2045. Hence, traditional email systems have no way of tracking a link, attachment or image in the message when the messages are forwarded outside their systems. Even within their systems, Google and Yahoo allow users to access their accounts using POP and IMAP clients, which download the entire message in the RFC 2045 format making it impossible to track which users actually read the attachment or clicked on a link.

Metrics

The system maintains the metrics related to each short URL, including how many times the URL was accessed and in how many messages the URL was included. The system ignores repeated access of the same short URL from the same IP address to prevent spammers from manipulating the metrics.

Short URL Rating

The system allows users to rate a short URL on a scale of negative five to positive five. A negative five would be the most unfavorable rating, a positive five would the most favorable rating and zero would be a neutral rating. The system maintains the cumulative rating of each short URL based on all the users that rated the URL.

Lists of Most Popular Short URLs

The system creates lists of most popular short URLs and makes them available as RSS feeds. These lists are categorized on most accessed, most included in email messages and best rated. They are also categorized on whether the short URL is to an original link, attachment or an image.

Spam Control

The system allows users to specify that a short URL is a spam. The system maintains the total number of users that marked a URL as spam and the total number of users that accessed and forwarded it.

The system shows the spam rating next to a short URL which allows each user to decide whether to access the URL or not. The system also allows each user to specify a maximum spam rating of a URL above which the URL will be suppressed from that user and in addition any email message containing that URL will be moved to the spam folder.

Forwarding Short URLs Only

The system allows users to forward just the short URLs in an email message. Normal forwarding includes the entire original message with the name of the friend who originally sent it and his comments. Forwarding just the short URLs protects the privacy of the friend by not exposing his name or comments to other people that he may not know.

Threading Messages

The system shows email messages as conversations based on the first short URL in the message that already exists in another message in the user's inbox. It also allows the users to find all messages that were sent to him or by him which contain a particular group of short URLs.

Searching

The system indexes each message using a text search engine like Apache Lucene. It includes the content in the message body, any textual content in the attachments and the content in all the web pages in each original link included in the message.

Such an index allows the user to search messages or web pages whose links were included in the message. Users can perform advanced searches on specific words or word combinations using Boolean operators.

Identifying URLs

The system looks at the href attributes of all the anchor tags in a HTML email for original links. If an anchor tag does not specify a non empty href attribute, it takes the text within the anchor tag as the original link. It also processes text that is not within anchor tags and looks for any sequence of characters that could represent a web address. Such a sequence would either start with http:// or https:// or www. or end with .com, .net or other top level domain names. The system converts such sequence of characters to an anchor tag and uses the sequence of characters as the href attribute. This technique is used widely in HTML editors and some online email providers.

SMTP Proxy

The system allows each user to use his email account as an SMTP proxy. In this mode, the system allows the user to maintain a mapping to another email account and optionally a mapping to a public profile in another system.

When this mode is used, the system, in addition to performing all the other actions, sends each email message to the other email server that the user specified and places all the short URLs in a public profile for that user in the other system.

What is claimed is:

1. An email system comprising one or more server computers having operable instructions to: identify a plurality of URLs in a message body of an email sent by an email account in the system, each identified URL henceforth referred to as an original link, wherein the system replaces each said original link with a corresponding short URL in the message body, wherein each said short URL redirects to the corresponding original link and maintain a public profile for the email account in the system and places each said short URL in the email sent from the said email account in the public profile.

2. The email system of claim 1 further comprising instructions to: generate a same short URL when an original link in a message exactly matches a different original link in a previous message.

3. The email system of claim 1 further comprising instructions to: remember both the original link and another link to which the original link redirects and generate a same short URL for both said original link and said another link.

4. The email system of claim 1 further comprising instructions to: maintain metrics on the short URL including how many times the short URL was accessed and how many email messages the short URL was included in.

5. The email system of claim 4 further comprising instructions to: create a list of most popular short URLs based on said metrics.

6. The email system of claim 1 further comprising instructions to: extract a title from inside a title tag of an HTML web page for the original link and associate said title with the short URL and fill a subject line of an email that contains the short URL with said title.

7. The email system of claim 1 further comprising instructions to: not include the short URL in the public profile if an email address in a recipient list is a designated email address.

8. The email system of claim 1 further comprising instructions to: process each attachment in the email message and save a copy of the attachment to generate a publicly accessible short URL to the save copy of the attachment and include the said publicly accessible short URL in the body of the message wherein the system redirects any incoming requests to the publicly accessible short URL to the attachment.

9. The email system of claim 8 further comprising instructions to: identify a match between an attachment in the message and a different attachment in a different email wherein a same short URL is generated for both attachments.

10. The email system of claim 1 further comprising instructions to: process each embedded image in the email message and save a copy of the image to generate a publicly accessible short URL to the saved copy of the image and replace all references to the image in the image in the message with said publicly accessible short URL wherein the system redirects any incoming requests to the publicly accessible short URL to the embedded image.

11. The email system of claim 10 further comprising instructions to: identify a match between an image in the email message with a different image in a different email wherein a same short URL is generated for both images.

12. The email system of claim 1 further comprising instructions to: process each HTML image tag in the message and if the image tag points to an external URL generate a short URL and replace the external URL with the short URL.

13. The email system of claim 1 further comprises instructions to: forwarding only one or more short URLs in an email message.

14. The email system of claim 1 further comprising instructions to: act as a Simple Mail Transfer Protocol (SMTP) proxy to another system and send every message processed to the other system.

15. The email system of claim 1 further comprising instructions to: allow users to rate a short URL.

16. The email system of claim 1 further comprising instructions to: mark a short URL as spam.

17. The email system of claim 16 further comprising instructions to: record a cumulative spam rating of each short URL wherein the cumulative spam rating is defined as a ratio of number of times a short URL was marked as spam to a number of times the short URL was accessed.

18. The email system of claim 17 further comprising instructions to: record a setting for an email address referred to as a spam setting that specifies a maximum spam rating of a short URL above which the short URL will be considered as spam for said email address.

19. The email system of claim 18 further comprising instructions to: mark each message including an embedded short URL with a spam rating greater than the spam setting for said email address as spam for said address.

20. The email system of claim 1 further comprising instructions to: add each message including content in the message body, any text content in the attachments, and content in web pages of each URL included in the message to a search index maintained by a search engine.

21. A computer-implemented method of processing an email message comprising: identify a plurality of URLs in a message body of an email sent by an email account in the system, each identified URL henceforth referred to as an original link, wherein the system replaces each said original link with a corresponding short URL in the message body, wherein each said short URL redirects to the corresponding original link and maintain a public profile for the email account in the system and places each said short URL in the email sent from the said email account in the public profile.

22. The method of claim 21 further comprising: generating a same short URL when an original link in a message exactly matches a different original link in a previous message.

23. The method of claim 21 further comprising: recording both the original link and a second link to which the original link redirects and generating a same short URL for both said original link and said second link.

24. The method of claim 21 further comprising: maintaining metrics on the short URL including how many times the short URL was accessed and how many email messages the short URL was included in.

25. The method of claim 24 further comprising: creating a list of most popular short URLs based on said metrics.

26. The method of claim 21 further comprising: extracting a title from inside a title tag of an HTML web page represented by the original link and associating said title with the short URL and filling a subject line of an email message that contains the short URL with said title.

27. The method of claim 21 further comprising: not including the short URL in the public profile if an email address in a recipient list is a designated email address.

28. The method of claim 21 further comprising: process each attachment in the email message and save a copy of the attachment to generate a publicly accessible short URL to the save copy of the attachment and include the said publicly accessible short URL in the body of the message wherein the system redirects any incoming requests to the publicly accessible short URL to the attachment.

29. The method of claim 28 further comprising: identify a match between an attachment in the message and a different attachment in a different email wherein a same short URL is generated for both attachments.

30. The method of claim 21 further comprising instructions to: process each embedded image in the email message and save a copy of the image to generate a publicly accessible short URL to the saved copy of the image and replace all references to the image in the image in the message with said publicly accessible short URL wherein the system redirects any incoming requests to the publicly accessible short URL to the embedded image.

31. The method of claim 30 further comprising: identify a match between an image in the email message with a different image in a different email wherein a same short URL is generated for both images.

32. The method of claim 21 further comprising: processing each HTML image tag in the message and if the image tag points to an external URL generating a short URL and replacing the external URL with the short URL.

33. The method of claim 21 further comprising: forwarding only one or more short URLs in an email message.

34. The method of claim 21 further comprising: acting as a SMTP proxy to another system and sending every processed message to the other system.

35. The method of claim 21 further comprising: allowing users to rate a short URL.

36. The method of claim 21 further comprising: recording a short URL as spam.

37. The method of claim 36 further comprising: mark each message including an embedded short URL with a spam rating greater than the spam setting for said email address as spam for said address.

38. The method of claim 36 further comprising: record a cumulative spam rating of each short URL wherein the cumulative spam rating is defined as a ratio of number of times a short URL was marked as spam to a number of times the short URL was accessed.

39. The method of claim 36 further comprising: record a setting for an email address referred to as a spam setting that specifies a maximum spam rating of a short URL above which the short URL will be considered as spam for said email address.

40. The method of claim 21 further comprising: add each message including content in the message body, any text content in the attachments, and content in web pages of each URL included in the message to a search index maintained by a search engine.

* * * * *